United States Patent Office 3,535,267
Patented Oct. 20, 1970

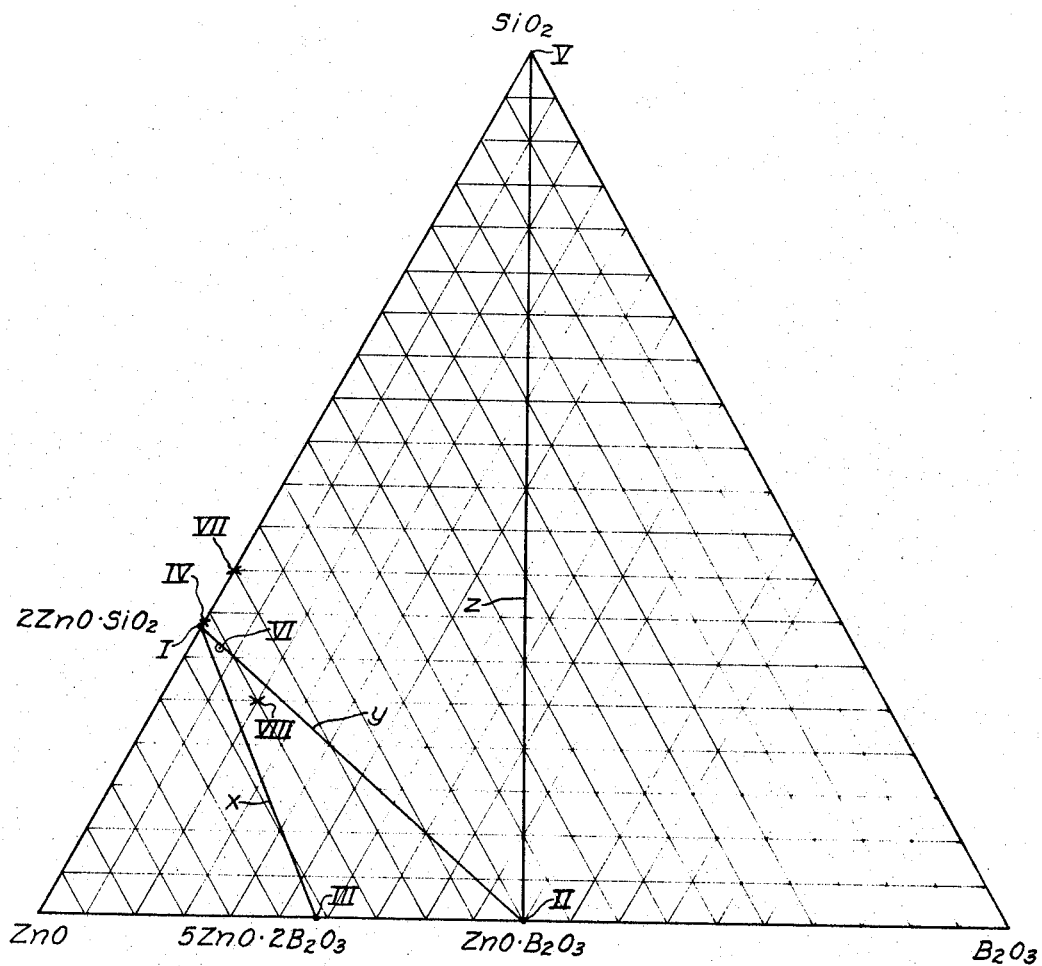

3,535,267
ZINC ORTHOSILICATE PHOSPHOR OF IMPROVED MAINTENANCE AND ITS MANUFACTURE
James F. Sarver, Highland Heights, Ohio, assignor to General Electric Company, a corporation of New York
Filed Sept. 21, 1967, Ser. No. 669,501
Int. Cl. C09k 1/54
U.S. Cl. 252—301.6
9 Claims

ABSTRACT OF THE DISCLOSURE

Deleterious extraneous phases such as $SiO_2$ can be essentially eliminated from zinc orthosilicate phosphor or luminescent material activated with manganese by reacting the phosphor with a mixture of $ZnO \cdot B_2O_3$ and $ZnO$. The product contains essentially only $2ZnO \cdot SiO_2$:Mn, $ZnO \cdot B_2O_3$, and, optionally, $5ZnO \cdot 2B_2O_3$. $ZnO \cdot B_2O_3$ activated with manganese is a green-emitting luminescent material, as is the zinc orthosilicate itself, and thus is useful rather than being a mere diluent or being harmful. $5ZnO \cdot 2B_2O_3$ is a diluent but need not be present in significant quantities, if at all. Such phosphors have improved maintenance of light output in lamps, especially in highly loaded lamps used for reprography.

CROSS-REFERENCES TO RELATED APPLICATIONS

This application concerns an improvement over current zinc orthosilicate phosphors activated with manganese and processes for manufacturing the same. Another application which describes current zinc orthosilicate technology and its historical development is application Ser. No. 418,229—Kaduk, filed Dec. 14, 1964, now Pat. 3,416,019, granted Dec. 10, 1968, assigned to the assignee of the present invention. The disclosure of that application is hereby incorporated into this application by reference.

BACKGROUND OF THE INVENTION

This invention relates to improved green phosphor or luminescent materials. More particularly, it relates to improved zinc orthosilicate phosphors activated with manganese.

Manganese activated zinc silicate, although it is one of the oldest and brightest commercial phosphors and has been used for more than a decade, is unsatisfactory for many uses in fluorescent lamps because of its poor maintenance of light output over a period of time of lamp operation. This poor maintenance has been attributed in part to the presence of unreacted $ZnO$, $SiO_2$, or both together. Because $ZnMn_2O_4$ is a brown, darkly colored material and detracts from light output of the phosphor, zinc oxide excesses are undesirable and are generally avoided in the production of these phosphors. Since it is generally impossible in a practical manufacturing process to produce precisely stoichiometric phosphor, this leads to a greater or lesser excess of silica in the phosphor. Silica can occur in several crystalline modifications or as an amorphous material.

The poor maintenance of zinc silicate has been attributed primarily to damage by mercury ions, with only small amounts of depreciation due to damage to the phosphor itself by the 1849 A. radiation of the mercury arc in fluorescent lamps. The mercury damage can be associated with the excess silica simply by surface absorption of mercury, darkening the body color of the phosphor and unproductively absorbing both the ultraviolet energy of the arc and light produced by the phosphor. Over the years, maintenance has been improved by decreasing the amount of excess silica to much nearer the stoichiometric ratio, i.e., $Zn_2SiO_4$. Care must be taken to avoid going beyond the stoichiometric ratio which would leave excess $ZnO$ that could react with the manganese to form the above-mentioned brown $ZnMn_2O_4$. Improvements in minimizing excess silica have been disclosed in the above-identified Kaduk application which uses an $$MgF_2—NH_4Cl$$

flux firing method for improved maintenance.

However, further improvements in maintenance of this phosphor are still desirable. Some excess silica does remain in phosphors made according to the current prior art.

SUMMARY OF THE INVENTION

An object of the present invention is to provide improved zinc orthosilicate phosphors activated with manganese and a method of producing the same, particularly with improved maintenance of light output over the life of a lamp using the phosphors.

Briefly stated, the present invention in one of its embodiments provides luminescent material consisting essentially of manganese-activated $2ZnO \cdot SiO_2$, $ZnO \cdot B_2O_3$, and, optionally, $5ZnO \cdot 2B_2O_3$, and being free of uncombined $SiO_2$, said luminescent material consisting predominantly of $2ZnO \cdot SiO_2$, said luminescent material also containing combined $B_2O_3$ in at least a small but effective amount effective to compound as $ZnO \cdot B_2O_3$ with $ZnO$ which is present in an amount above that stoichiometrically needed to form said $2ZnO \cdot SiO_2$, and, if enough $ZnO$ is present relative to said $B_2O_3$, $5ZnO \cdot 2B_2O_3$ also being present.

Preferred quantities of combined $B_2O_3$ on a molar basis are from about 0.1% to about 20%, with about 3% being optimum in some circumstances.

The invention also provides the method of producing such phosphor wherein zinc orthosilicate phosphor activated with manganese and having an excess of silica over stoichiometric proportions is mixed with $ZnO \cdot B_2O_3$ and $ZnO$ in proportions which, when reacted with said zinc orthosilicate, will produce a luminescent material whose constituents are essentially only $2ZnO \cdot SiO_2$ activated with manganese, $ZnO \cdot B_2O_3$, and optionally $$5ZnO \cdot 2B_2O_3$$

and reacting said mixed materials at elevated temperature and for a time sufficient to essentially complete said reaction.

Although the above method is generally preferred, other materials can be added to the starting zinc orthosilicate phosphor instead of $ZnO \cdot B_2O_3$ and $ZnO$ to get the same end product. Their selection and proportions depend on the starting phosphor and the result desired. The combinations of other materials include the following:

$ZnO$ and $5ZnO \cdot 2B_2O_3$,
$ZnO$ and $H_3BO_3$,
$5ZnO \cdot 2B_2O_3$ and $ZnO \cdot B_2O_3$,
$5ZnO \cdot 2B_2O_3$ and $H_3BO_3$, and
$5ZnO \cdot 2B_2O_3$ alone.

Due to the nature of $B_2O_3$, $H_3BO_3$ or other compounds which decompose on heating to $B_2O_3$ are used in its place.

It is preferable to conduct such reaction at temperatures in the range of about 750–950° C. and for times in the range of about 0.5–3 hours and in an atmosphere of air or preferably nitrogen or other inert gases. An optimum procedure is firing at 890° C. for about 1.5 hours in nitrogen.

BRIEF DESCRIPTION OF THE DRAWING

The sole figure of the drawing is a ternary phase compatibility diagram for the constituents $ZnO$, $SiO_2$, and $B_2O_3$, showing the compatibility triangles, particularly the compatibility triangle having as its apices $2ZnO \cdot SiO_2$, which is the phosphor of the prior art activated with manganese, $ZnO \cdot B_2O_3$ which is one of the principal preferred additives to the old phosphor to obtain the advantages of the invention, and $5ZnO \cdot 2B_2O_3$. Since there is a compatibility triangle with these three constituents, any point on the ternary phase diagram within this triangle will consist only of mixtures of these three constituents.

DESCRIPTION OF THE PREFERRED EMBODIMENTS

Stated conceptually, one of the objectives of the invention is to eliminate excess silica in commercial zinc silicate phosphors activated with manganese without ending up with any free zinc oxide. As a practical matter, in commercial manufacture it is not possible to make a precisely stoichiometric zinc silicate without an excess of either zinc oxide or silica, if those are the only constituents of the material. Applicant has discovered that the excess silica can be disposed of by additions in appropriate amounts of ZnO and $ZnO \cdot B_2O_3$, or other materials stated above, resulting in the phosphor of the invention. At about 600° C. $\alpha ZnO \cdot B_2O_3$ converts to the $\beta$ form which is used in the present invention.

A ternary phase diagram of the system $$ZnO—B_2O_3—SiO_2$$

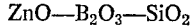

has been published. E. Ingerson, T. W. Morey, and O. F. Tuttle, Phase Diagrams for Ceramists, Fig. 759 (1964). This diagram, supplemented by applicant's own researches, has resulted in the compatibility diagram of the sole figure of the drawing. There are only three binary compounds in the system and no ternary compounds. The binary compounds are $2ZnO \cdot SiO_2$ at point I, $ZnO \cdot B_2O_3$ at point II, and $5ZnO \cdot 2B_2O_3$ at point III. The compatibility triangles have been determined to be those formed by the outline of the ternary phase diagram and lines $x$, $y$ and $z$ connecting these compounds and connecting point II with the $SiO_2$ apex of the ternary diagram, V. The meaning of a compatibility triangle in such systems is that a composition at any point on the overall ternary diagram which falls within one of these triangles will be composed of the three end members of the triangle, and a point on one of the lines will be composed of the end members at each end of the line, in proportions determined by the position of the composition on the line or in the area. Thus, any composition within the triangle I–II–III will be made up of the crystalline phases $2ZnO \cdot SiO_2$, $ZnO \cdot B_2O_3$ and $5ZnO \cdot 2B_2O_3$ in proportions determined by the actual composition.

The diagram shows that it is possible to convert a zinc orthosilicate phosphor containing excess silica, such as one represented by point IV to a composition within compatibility triangle I–II–III by the addition of ZnO and $ZnO \cdot B_2O_3$ in appropriate amounts. $ZnO \cdot B_2O_3$:Mn is a yellow-green-emitting luminescent material. The emission is not greatly different from that of the zinc orthosilicate phosphor itself. Thus, $ZnO \cdot B_2O_3$ is not only not deleterious to the phosphor but is also a useful light producing material rather than being a mere diluent, even if it is not as efficient a light producer as zinc orthosilicate itself. The third constituent of any composition within the compatibility diagram I–II–III, $5ZnO \cdot 2B_2O_3$, is a nondeleterious diluent. Therefore, that material is not harmful but it is preferable to avoid larger amounts of that material than necessary. An optimum composition of the invention would be on the line I–II, as close to I as commercially feasible while still assuring that there is no excess silica present. Since compositions in the diagram I–II–V would contain silica, it is practically necessary for purposes of the invention that the composition be below line I–II, and therefore in triangle I–II–III rather than in the triangle I–II–V.

As is evident from the drawing, an absolute theoretical minimum on amounts of $ZnO \cdot B_2O_3$ effective to give the results of the invention is not meaningful, since practical considerations such as the accuracy of weighing necessitate the use of finite quantities of the certain reactants. Therefore, the lower limit is stated as a small but effective amount effective to neutralize deleterious excess silica by producing a composition in the triangle I–II–III. Also, the upper limit of $ZnO \cdot B_2O_3$ is not theoretically a precise boundary, but, since manganese-activated $ZnO \cdot B_2O_3$ is not as efficient as zinc silicate, the objects of the invention require that the resulting material be predominantly, such as at least about 50 molar percent, zinc orthosilicate. Moreover, preferred and certain optimum proportions of compositions of the invention have been stated above.

Since the present invention involves a new process starting with preformed zinc orthosilicate phosphors activated with manganese, processes of the prior art are suitable for producing this phosphor starting material, especially the process described and claimed along with the product of the above-identified Kaduk application.

As described in that application, a suitable batch formula for a phosphor used as a starting material for the present invention is as follows:

760 grams zinc oxide (phosphor grade)
333 grams silica (Mallinckrodt SL grade 8.2% $H_2O$)
58 grams manganese carbonate (44.5% Mn)
13 grams magnesium fluoride An equivalent quantity of MnO or manganese salt heat-decomposable to MnO may be used in lieu of $MnCO_3$. The molar composition of the above mix before firing may be given as:

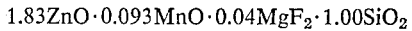

$$1.83ZnO \cdot 0.093MnO \cdot 0.04MgF_2 \cdot 1.00SiO_2$$

The $MgF_2$ is a desirable flux. The fluorine is removed as a volatile phase at a suitably high temperature, and at least some of the magnesium enters into the $Zn_2SiO_4$:Mn phosphor structure, substituting for a small amount of zinc, and acting as a harmless diluent.

In a preferred process for producing such starting phosphor, these ingredients are first blended together in a twin shell blender for 10–15 minutes and then ball milled together in a one-gallon ball mill for 45 minutes. The ingredients are next fired in uncovered trays at a temperature in the range of 1250–1350° C., desirably about the midpoint of this range, suitably 1290–1300° C., for a time sufficient to assure full reaction, suitably about three hours for the stated batch. The fired cake is then crushed with mortar and pestle or other suitable means, mixed with ammonium chloride in a proportion of about 0.1% to 0.6% by weight of the phosphor, and then refired in the same temperature range and for like time interval.

This starting phosphor is then mixed thoroughly preferably with ZnO and $ZnO \cdot B_2O_3$ in proportions suitable to bring the ultimate reaction product into the compatibility triangle I–II–III.

As a particular example, starting phosphor is used which has a composition at point IV in the sole figure of the drawing, that is, about 34% $SiO_2$, 66% ZnO by moles, or a molar ratio of basic ingredients ZnO, MnO and MgO, to the acid ingredient $SiO_2$, of 1.96:1. The batch for the process of the present invention is mixed as follows:

0.92 mole zinc silicate phosphor or 200 grams
0.0967 mole $ZnO \cdot B_2O_3$ or 14.6 grams (formed by reacting ZnO and $H_3BO_3$ at 750° C.)
0.0683 mole ZnO or 5.5 grams.

It is often preferable to formulate the batch with $ZnO \cdot B_2O_3$ as the predominant additive to the starting phosphor. This batch when fired together will give composition at about VI, containing, about by moles, 3.3% $B_2O_3$, 30.8% $SiO_2$ and 66% ZnO. As is known in the art, this composition, stated in terms of the end members of the overall ternary phase diagram, does not represent the actual equilibrium crystalline phases which are $2ZnO \cdot SiO_2$, $ZnO \cdot B_2O_3$, and $5ZnO \cdot 2B_2O_3$ because it is within compatibility triangle I–II–III.

This batch was intimately mixed and fired in fused silica trays at about 890° C. for about 1½ hours in air. Temperatures should be chosen to avoid eutectic melting, and times and temperatures should be sufficient to obtain essentially equilibrium results. The phosphor was milled and lamps were produced with coatings of this phosphor.

As is known in the art, the maintenance of light output of $Sn_2SiO_4$:Mn lamps is improved by adding small amounts of $Sb_2O_3$, such as 0.125 weight percent relative to the phosphor, to the phosphor as it is being made into a suspension to be used for coating the lamps.

Table I below shows light production and maintenance results after various times of lamp operation obtained with phosphors produced in accordance with the invention as compared to phosphors of the prior art which were not refired with $B_2O_3$-containing compounds. In each case, the same batch of phosphor used as illustrative of the prior art was also used to produce the improved phosphor of the invention for comparative testing. Tests were performed with phosphors made by conventional techniques at the composition of point IV of the drawing. This phosphor was used to prepare phosphors of the invention at point VI both by firing in air and by firing in nitrogen. For comparison, the IV phosphor was also heat treated in nitrogen. In each case, phosphors of the invention had better maintenance than prior art phosphors. Also, nitrogen firing improved the brightness of each type of phosphor. Table I also presents color data for each phosphor in standard CIE coordinates.

TABLE I.—FORCE TEST LAMP DATA FOR ZINC BORATE-MODIFIED ZINC SILICATE PHOSPHORS

| Lamp series | Composition number | Heat treatment | | | 0 hr. | | 100 hr. | | | 300 hr. | | | 100 hr. color data | |
|---|---|---|---|---|---|---|---|---|---|---|---|---|---|---|
| | | Temp., °C. | Time, hr. | Atmosphere | Lumen, $L_0$ | $L_0$/watt | L | L/W | $L/L_0$×100 | L | L/W | $L/L_0$×100 | x | y |
| 1 | IV[1] | | | | 4949 | 119.6 | 4423 | 108.2 | 90.5 | 3855 | 93.8 | 78.4 | 0.2431 | 0.6264 |
| 2 | VI | 890 | 1.5 | Air | 4680 | 112.7 | 4199 | 102.7 | 91.1 | 3772 | 91.2 | 80.9 | 0.2434 | 0.6199 |
| 3 | IV[1] | 1000 | 1.5 | $N_2$ | 5093 | 122.1 | 4579 | 111.4 | 91.2 | 4139 | 100.0 | 81.9 | 0.2431 | 0.6287 |
| 4 | VI | 890 | 1.5 | $N_2$ | 4745 | 114.3 | 4354 | 106.7 | 93.4 | 3941 | 95.5 | 83.6 | 0.2426 | 0.6224 |

[1] Control.

Further examples of methods of the invention will now be presented using a starting phosphor of

$$1.5(ZnO+MnO) \cdot 1.00 SiO_2$$

represented by point VII on the drawing and equivalent to 0.60 mole ZnO:Mn plus 0.40 mole $SiO_2$. This phosphor will be converted to an improved phosphor of the invention which has a composition at point VIII on the drawing, or—

| | Mole |
|---|---|
| ZnO:Mn | 0.65 |
| $SiO_2$ | 0.25 |
| $B_2O_3$ | 0.10 |

This conversion can be accomplished by making a batch of—

| | Mole |
|---|---|
| Phosphor | 0.25 |
| $ZnO \cdot B_2O_3$ | 0.10 |
| ZnO | 0.175 | and firing in accordances with the previous examples.

Another suitable batch is—

| | Mole |
|---|---|
| Phosphor | 0.25 |
| $H_3BO_3$ | 0.20 |
| ZnO | 0.275 |

Still another suitable batch is—

| | Mole |
|---|---|
| Phosphor | 0.25 |
| $5ZnO \cdot 2B_2O_5$ | 0.5 |
| ZnO | 0.025 |

What I claim as new and desire to secure by Letters Patent of the United States is:

1. A process for producing luminescent material comprising the following steps: mixing zinc orthosilicate activated with manganese and having an excess of silica over stoichiometric proportions with certain reactants in proportions which, when reacted with said zinc orthosilicate, will produce a luminescent material whose constituents are essentially only $2ZnO \cdot SiO_2$, $ZnO \cdot B_2O_3$, and, optionally, $5ZnO \cdot 2B_2O_3$ in amounts less than 50 mole percent, and reacting said mixed materials at elevated temperatures and for a time sufficient to essentially complete such reaction, said certain reactants being selected from the group consisting of $5ZnO \cdot 2B_2O_3$ alone and the following combinations:

ZnO and $ZnO \cdot B_2O_3$,
ZnO and $5ZnO \cdot 2B_2O_3$,
ZnO and materials which decompose on heating to $B_2O_3$,
$5ZnO \cdot 2B_2O_3$ and $ZnO \cdot B_2O_3$, and
$5ZnO \cdot 2B_2O_3$ and materials which decompose on heating to $B_2O_3$.

2. A process of claim 1 in which said certain reactants are ZnO and $ZnO \cdot B_2O_3$.
3. A process of claim 1 in which said certain reactants are ZnO and $H_3BO_3$.
4. A process of claim 1 in which said certain reactants are ZnO and $5ZnO \cdot 2B_2O_3$.
5. A process of claim 1 in which said certain reactants are $5ZnO \cdot 2B_2O_3$ and $ZnO \cdot B_2O_3$.
6. A process of claim 1 in which said certain reactants are $5ZnO \cdot 2B_2O_3$ and $H_3BO_3$.
7. A process of claim 1 in which said certain reactants are $5ZnO \cdot 2B_2O_3$.
8. A process of claim 1 wherein said reaction is conducted at temperatures in the range of about 750–950° C. for a time in the range of about 0.5–3 hours.
9. A process of claim 1 wherein said reaction is conducted in an atmosphere of nitrogen gas.

References Cited

UNITED STATES PATENTS 2,241,939  5/1941  Aschermann et al.
2,124,225  7/1938  Batchelor.

OTHER REFERENCES

Kroger, Some Aspects of the Luminecence of Solids, 1948, pp. 270–272.

TOBIAS E. LEVOW, Primary Examiner

R. D. EDMONDS, Assistant Examiner